United States Patent
Nolte

(10) Patent No.: US 8,974,911 B2
(45) Date of Patent: Mar. 10, 2015

(54) METHOD FOR APPLYING A FIREPROOF COATING ON A SUBSTRATE

(75) Inventor: Mathias Nolte, Hamburg (DE)

(73) Assignee: Lufthansa Technick AG, Hamburg (DE)

(*) Notice: Subject to any disclaimer, the term of this patent is extended or adjusted under 35 U.S.C. 154(b) by 272 days.

(21) Appl. No.: 13/242,456

(22) Filed: Sep. 23, 2011

(65) Prior Publication Data

US 2012/0135258 A1    May 31, 2012

(30) Foreign Application Priority Data

Sep. 27, 2010 (DE) .......... 10 2010 046 536
Dec. 13, 2010 (DE) .......... 10 2010 054 341

(51) Int. Cl.
*B32B 21/04* (2006.01)

(52) U.S. Cl.
USPC ............ 428/537.1; 428/423.1; 428/481; 428/524; 428/511; 427/384; 427/393; 427/393.3

(58) Field of Classification Search
USPC ............ 428/537.1, 423.1, 481, 524, 511; 427/384, 393, 393.3
See application file for complete search history.

(56) References Cited

U.S. PATENT DOCUMENTS

| 4,196,260 A * | 4/1980 | Nachbur ............... 428/526 |
| 4,230,746 A * | 10/1980 | Nahta .................. 427/373 |
| 6,541,068 B1 * | 4/2003 | Galbraikh et al. ..... 427/393.3 |
| 7,482,395 B2 * | 1/2009 | Mabey et al. ......... 523/122 |

FOREIGN PATENT DOCUMENTS

DE        19751434 A1    7/1999

OTHER PUBLICATIONS

Ullmann's Encyclopedia of Industrial Chemistry, 6th edition, vol. 24, (Paints and Coatings) pp. 594-790, 2002.
Ullmann's Encyclopedia of Industrial Chemistry, 6th edition, vol. 39, (Wood, surface treatment) pp. 515-523, 2002.
EPO Machine Translation of DE19751434 A1 Description, Published Jul. 29, 1999, translation retrieved on Jan. 5, 2012.
Ullmann's Encyclopedia of Industiral Chemistry, 6th edition, vol. 24, (Paints and Coatings) pp. 594-790, 2002.
Ullmann's Encyclopedia of Industrial Chemistry, 6th edition, vol. 39, (Wood, surface treatment) pp. 515-523, 2002.

* cited by examiner

*Primary Examiner* — Leszek Kiliman
(74) *Attorney, Agent, or Firm* — Casimir Jones S.C.

(57) ABSTRACT

The invention relates to a process for applying a fire-protection coating to a substrate using a process comprising the steps of applying a first clearcoat layer to the substrate, applying an intumescent fire-protection layer to the first clearcoat layer, and applying a second clearcoat layer to the intumescent fire-protection layer.

15 Claims, 1 Drawing Sheet

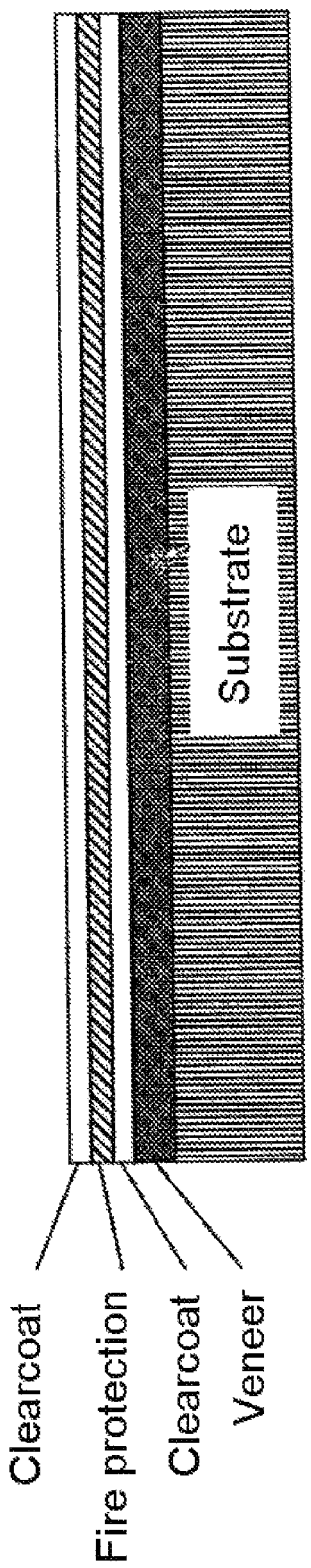

METHOD FOR APPLYING A FIREPROOF COATING ON A SUBSTRATE

The present application claims the benefit of German Patent Application Serial Number 102010046536.4, filed Sep. 27, 2010 and German Patent Application Serial Number 102010054341.1, filed Dec. 13, 2010.

FIELD OF THE INVENTION

The invention relates to a process for applying a fire-protection coating to a substrate, and also to a substrate thus coated.

BACKGROUND OF THE INVENTION

In the fitting-out of internal spaces, wood surfaces, in particular wood veneers, are often used on cladding, furniture, or the like. The coating here is intended firstly to improve the appearance of the surface and secondly to provide protection, for example from mechanical stresses. In particular instances, this type of coating also has the function of improving fire protection.

By way of example, when furniture or cladding is installed into the interior of an aircraft there is a need to comply with fire-performance requirements under air traffic legislation. A component of this type is subjected, for example, to a Bunsen burner fire test with 60 s of exposure to a flame at a temperature of 860° C. Extinguishment of the component must occur within 15 s after the end of flame application. The distance between the point of flame application and the most distant point burnt by the flame on the surface of the specimen is not permitted to be more than 155 mm (FAA CS 25.853 (a)).

From public prior use, it is known that wood can be provided with flame-retardant impregnation. A disadvantage here is that this type of impregnation can discolor the wood and sometimes acts as plasticizer within a clearcoat layer subsequently applied. There can also be impairment of adhesion of a coating layer on the impregnated surface. It is also known from public prior use that clearcoat can be provided with chemical fire-protection compositions. Here again, a disadvantage is that discoloration of the wood surface can occur, and that the flame retardants can have an undesirable plasticizing effect.

SUMMARY OF THE INVENTION

It is an object of the invention to provide a process and a coated substrate of the type mentioned in the introduction, where these combine good surface properties with good fire protection.

The process of the invention achieves said object via the following steps:
a) applying a first clearcoat layer to the substrate;
b) applying an intumescent fire-protection layer to the first clearcoat layer;
c) applying a second clearcoat layer to the intumescent fire-protection layer.

DESCRIPTION OF THE DRAWING

FIG. 1 shows a representation of a cross-sectional view of a substrate having a veneer surface and a first clearcoat layer, a fire-protection layer, and a second clearcoat layer.

DEFINITIONS

Some terms used for the purposes of the invention will first be explained. A substrate is by way of example a piece of furniture, a wall cladding, or the like. Preference is given to a substrate with a wood surface.

The substrate can have been manufactured from solid wood, or can preferably be composed of a wood veneer on a supportive structure. The supportive structure can comprise a particle board, a sandwich structure, or the like.

The term clearcoat designates a coating which is in essence transparent and which does not hide a structure located thereunder, for example woodgrain.

DESCRIPTION OF THE INVENTION

An intumescent fire-protection layer is applied as intermediate layer on said first clearcoat layer. An intumescent fire-protection layer comprises substances which increase their volume on exposure to heat and thus have a flame-retardant effect. Intumescent fire-protection mixtures which are suitable for producing an appropriate coating are disclosed by way of example in DE 197 51 434 A1.

In the invention, a second clearcoat layer is applied to the intumescent fire-protection layer. The first and second clearcoat layer can also be applied in a plurality of respective individual layers for the purposes of the invention.

The invention thus permits both that region of the entire coating that faces toward the substrate and that region that faces toward the exterior surface to have the properties of the clearcoat used, so that the resistance of the surface to exterior stresses and the interaction with the substrate are determined entirely via the properties of the clearcoat. The intumescent fire-protection layer has been inserted rather in the manner of a sandwich between two clearcoat layers and cannot therefore have any disadvantageous effect either on the surface properties of the entire coating or on the interaction with the substrate (in particular wood). Design of the fire-protection layer in the form of intumescent layer also permits achievement of particularly good flame retardancy.

It is preferable that the first and/or second clearcoat layer have been selected from the group consisting of polyurethane coatings, polyester coatings, and poly(meth)acrylate coatings. These comprise coatings which are in particular used for coating of wood and of wood veneer surfaces in the prior art.

Hardening of polyurethane coatings occurs via reaction of polyisocyanates with hydroxylated compounds. The hydroxy component can by way of example comprise polyesters, polyethers, or acrylic resins. Polyester coatings usually cure via polyaddition of unsaturated compounds. The same applies to poly(meth)acrylates. Examples of suitable coatings are described in Ullmann's Encyclopedia of Industrial Chemistry, 6$^{th}$ edition, volume 24, pp. 594 (Paints and Coatings); and volume 39, pp. 515 (Wood, surface treatment) specifically for wood surfaces. The cited disclosure is also incorporated within the subject matter of the present application.

The intumescent fire-protection layer in the invention can comprise an intumescent synthetic resin. An intumescent synthetic resin based on melamine/formaldehyde resin is particularly suitable. The intumescent fire-protection layer can also in particular comprise flame-retardant compounds, such as phosphoric ester. Suitable intumescent compositions are described by way of example in DE 197 51 434 A1, the disclosure of which is incorporated by way of reference. Intumescent fire-protection mixtures of this type are available commercially by way of example from AISCO Chemieprodukte GmbH as K1+K2 2-Component Fire Protection System.

The intumescent fire-protection layer can be applied in the invention with a thickness of from 40 to 200 µm, preferably from 60 to 120 µm, in particular by way of example approximately 80 µm.

The clearcoat layers and/or the intumescent fire-protection layer is/are preferably applied by spraying, in particular with a spray gun. Application by spraying can give a high-quality coating. Intumescent fire-protection compositions of the prior art are generally applied by way of example with a spreader. They are generally intended for fire protection on articles where visual quality of the surface is not critical.

In the invention it is preferable to adjust the viscosity of the intumescent mixture for producing an intumescent fire-protection coating of the invention in such a way as to permit application by a spray gun. Mixtures suitable for application by a spray gun are generally those of viscosity 16 s (45 mm$^2$/s) or greater (measured to DIN 53211 with a 4 mm flow cup). Preferred viscosity ranges are from 16 to 100 s (45 to 452 mm$^2$/s), preferably from 17 to 80 s (51 to 360 mm$^2$/s), more preferably from 19 to 60 s (63 to 267 mm$^2$/s). The viscosity can be adjusted with a suitable solvent, such as water.

The intumescent fire-protection layer can comprise an additive for compatibilization with the clearcoat layers. Examples of suitable compounds for compatibilization of intumescent fire-protection compositions based on melamine/formaldehyde with polyurethane clearcoats are polyether siloxanes, which are added at a concentration of, for example, about 1% by weight to the intumescent fire-protection composition.

Appropriate polyether siloxanes are obtainable by way of example from Evonik as TEGO Wet 270.

The invention further provides a substrate with a fire-protection coating, wherein the coating comprises:
 a) a first clearcoat layer on the substrate;
 b) an intumescent fire-protection layer on the first clearcoat layer;
 c) a second clearcoat layer on the intumescent fire-protection layer.

The invention further provides a substrate with a fire-protection coating, obtainable via a process of the invention.

An example of the invention is explained below, using the drawing, which is a diagram of the structure of a substrate coated in the invention.

The substrate used comprises a honeycomb sandwich panel with maple veneer adhesively bonded thereto.

The clearcoat layer is produced by using Crystallites® 2K PUR Top-Klarlack from Zweihorn. The manufacturer's instructions indicate that coating component and hardener component are used in a ratio by weight of 10:1.

The intumescent fire-protection mixture used comprises the K1+K2 2-Component Fire Protection System from AISCO Chemieprodukte GmbH. The manufacturer's instructions indicate that component K1 and component K2 are mixed in a ratio by weight of 6:4. Viscosity is then adjusted appropriately via dilution with 20% by weight of water, and 1% by weight of TEGO Wet 270 additive from Evonik (polyether siloxane) is incorporated by mixing.

The first clearcoat layer is applied by spraying onto the wood veneer of the sandwich panel until a closed-pore surface is produced. Once the material has been permitted to harden, said first clearcoat layer is subjected to an appropriate degree of abrasion, and then the intumescent fire-protection layer is applied by spraying at a thickness of 80 µm. This is likewise permitted to harden, and is subjected to an appropriate degree of abrasion. Once said intumescent fire-protection layer has been subjected to an appropriate degree of abrasion and thus activated, the second clearcoat layer is applied in two spray passes thereto.

A further inventive example is explained below.

The substrate used comprises a sheet of solid maple wood.

The clearcoat layer is produced by using Duritan® Two-Pack Pore Surfacer, Duritan® Three-Pack High-Solid Filling Primer, and Duritan® Three-Pack High-Solid High-Gloss Varnish from Zweihorn. The manufacturer's instructions indicate that component A and component B of the Pore Surfacer are used in a ratio by weight of 1:1, and coating component, hardener component, and activator component of the Filling Primer and of the High-Gloss Varnish are used in a ratio by weight of 100:100:2.

The intumescent fire-protection mixture used comprises the pyroplast-HW 300 fire-protection system from RÜTGERS Organics GmbH. The manufacturer's instructions indicate that component K1 and component K2 are mixed in a ratio by weight of 6:4.

Viscosity is then adjusted appropriately via dilution with 30% by weight of water, and 1% by weight of TEGO Wet 270 additive from Evonik (polyether siloxane) is incorporated by mixing.

The Duritan® Two-Pack Pore Surfacer is applied to the wood substrate in order to fill the pores of the wood. After curing via excitation with UV radiation, Duritan® Three-Pack High-Solid Filling Primer is applied by spraying until a closed-pore surface is produced. Layers of wet thickness 100 µm are applied here and are individually hardened via UV excitation. Said clearcoat layer is leveled by abrasion, and the intumescent fire-protection layer is then applied by spraying, at a wet thickness of 100 µm. This is permitted to harden via air-drying, and is subjected to an appropriate degree of abrasion. Once said intumescent fire-protection layer has been subjected to an appropriate degree of abrasion and thus activated, a further clearcoat layer made of Duritan® Three-Pack High-Solid Filling Primer is applied in two spray passes thereto. Finally, once the coating has been leveled by fine abrasion a final coating of Duritan® Three-Pack High-Solid High-Gloss Varnish is applied. After hardening via excitation with UV light, the final coating layer is polished to give high gloss: 90 gloss units.

The adhesion of the coating of the invention to DIN EN ISO 4624 is about 2 MPa.

The fire test described in the introduction to the description is found in the standard FAA CS 25.853 (a). When the coating of the invention is subjected to this test, the afterflame time is 0 s and the burnt section measures 85 mm.

What is claimed is:

1. A process for applying a fire-protection coating to a substrate, with the following steps:
 a) applying a first clearcoat layer to the substrate;
 b) applying an intumescent fire-protection layer to the first clearcoat layer, said intumescent fire-protection layer having a viscosity of from 16 to 100 s (45 to 452 mm$^2$/s; DIN 53 211, measured using 4 mm flow cup);
 c) applying a second clearcoat layer to the intumescent fire-protection layer.

2. The process as claimed in claim 1, wherein the first and/or second clearcoat layer has/have been selected from the group consisting of polyurethane coatings, polyester coatings, and poly(meth)acrylate coatings.

3. The process as claimed in claim 1, wherein the intumescent fire-protection layer comprises an intumescent synthetic resin.

4. The process as claimed in claim 3, wherein the intumescent synthetic resin is a melamine/formaldehyde resin.

5. The process as claimed in claim 1, wherein the intumescent fire-protection layer comprises phosphoric ester.

6. The process as claimed in claim 1, wherein the intumescent fire-protection layer is applied with a thickness of from 40 to 200 μm.

7. The process as claimed in claim 1, wherein the clearcoat layers and/or the intumescent fire-protection layer is/are applied by spraying.

8. The process as claimed in claim 1, wherein the intumescent fire-protection composition comprises a solvent for adjusting viscosity.

9. The process as claimed in claim 1, wherein the fire-protection composition comprises an additive for compatibilization with the first and/or second clearcoat layer.

10. The process as claimed in claim 9, wherein the additive comprises polyether siloxanes.

11. The process as claimed in claim 1, wherein the substrate comprises a wood surface.

12. The process as claimed in claim 6, wherein the intumescent fire-protection layer is applied with a thickness of from 60 to 120 μm.

13. The process as claimed in claim 1, wherein the viscosity of the intumescent fire-protection composition is from 17 to 80 s (51 to 360 mm$^2$/s; DIN 53 211, measured using 4 mm DIN flow cup).

14. The process as claimed in claim 1, wherein the viscosity of the intumescent fire-protection composition is from 19 to 60 s (63 to 267 mm$^2$/s; DIN 53 211, measured using 4 mm DIN flow cup).

15. The process as claimed in claim 8, wherein said solvent is water.

\* \* \* \* \*